United States Patent [19]

Matsuda et al.

[11] Patent Number: 4,910,621

[45] Date of Patent: Mar. 20, 1990

[54] MAGNETIC HEAD DEVICE HAVING SLOPED SLIDING SURFACE WHICH IS FORMED THERMALLY CURVED

[75] Inventors: Kyoya Matsuda, Yokohama; Yoshiharu Fujioka, Yamato; Shoji Tsutaki, Yokohama, all of Japan

[73] Assignee: Kabushiki Kaisha Toshiba, Kawasaki, Japan

[21] Appl. No.: 152,764

[22] Filed: Feb. 5, 1988

[30] Foreign Application Priority Data

Feb. 9, 1987 [JP] Japan .................................. 62-26231

Sep. 30, 1987 [JP] Japan .................................. 62-243977

[51] Int. Cl.⁴ .................................................. G11B 5/60

[52] U.S. Cl. ...................................... 360/104; 360/103

[58] Field of Search .................................. 360/102–104

[56] References Cited

U.S. PATENT DOCUMENTS 4,605,977 8/1986 Mathews ............................. 360/103

FOREIGN PATENT DOCUMENTS 61-257485 11/1986 Japan .................................. 360/103

*Primary Examiner*—John H. Wolff

*Attorney, Agent, or Firm*—Cushman, Darby & Cushman

[57] ABSTRACT

A magnetic disk recording/reproducing head device includes a slider member, a magnetic circuit, and a seal member. The slider member is made of a magnetic material. The slider member has at least one sliding surface opposing a recording/reproducing disk, both end portions thereof being formed in a direction perpendicular to the sliding surface. The slider member has a groove portion which is formed in one of the end portions to be parallel to the sliding surface. The magnetic circuit in the present invention has a core member made of a magnetic material and fixed to the other of the end portions of the sliding member, a predetermined magnetic gap which is formed between the core member and the slider member, and a coil which is wound around the core member. The seal member is made of a material having an adhesive property upon melting and a shrinking property upon stiffening and is sealed in the groove portion of the slider member so as to form an inwardly recessed tapered portion on part of the sliding surface corresponding to the groove portion when the seal member stiffens.

15 Claims, 6 Drawing Sheets

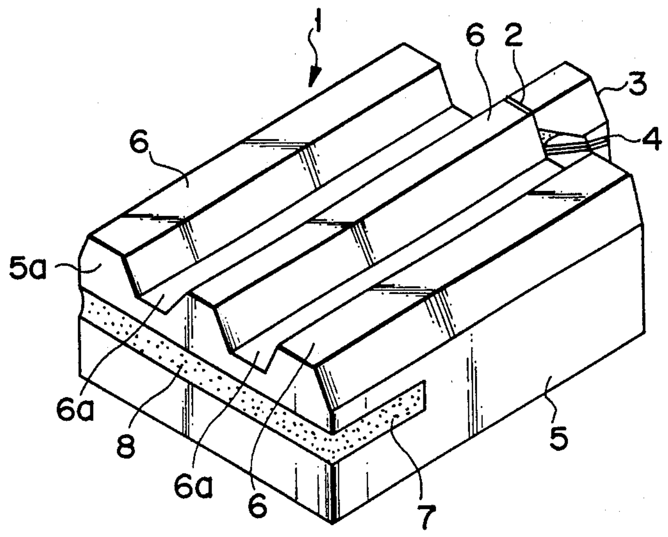
F I G. 4
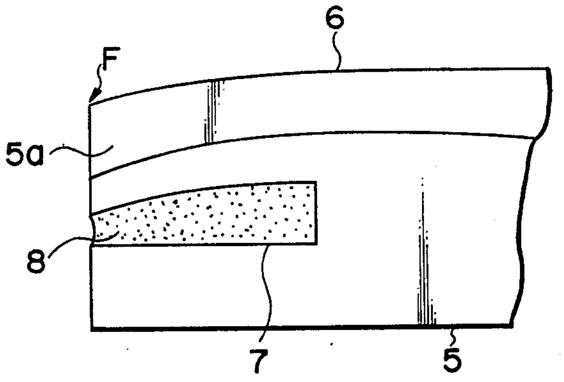
F I G. 5

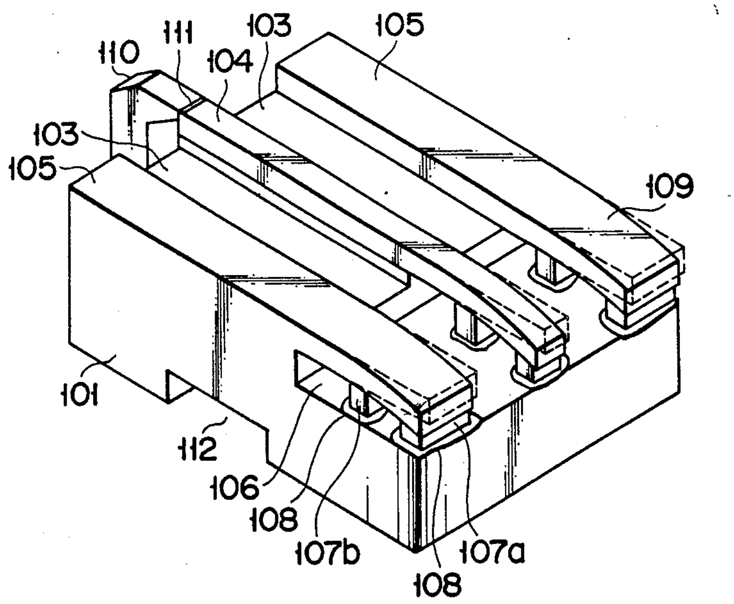
F I G. 13
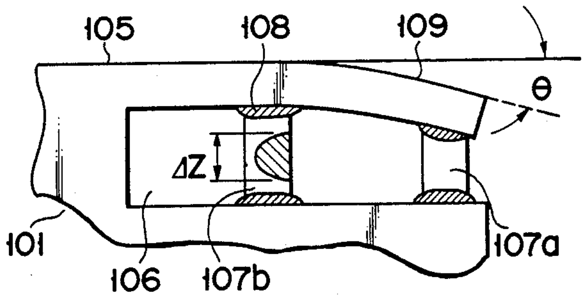
F I G. 14
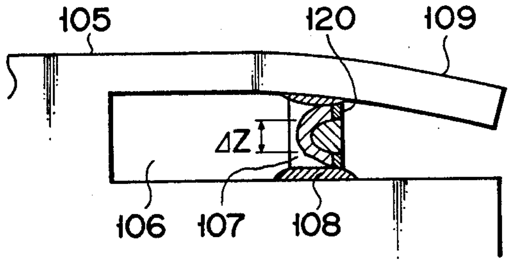
F I G. 15

MAGNETIC HEAD DEVICE HAVING SLOPED SLIDING SURFACE WHICH IS FORMED THERMALLY CURVED

BACKGROUND OF THE INVENTION

This invention relates to a magnetic disk recording-/reproducing head device and a method of manufacturing the same and, more particularly, to a magnetic head device for use in a magnetic recording/reproducing apparatus, for magnetically recording/reproducing data by floating over a disk-like magnetic recording medium such as a hard disk rotated at high speed, and also to a method of manufacturing such a magnetic head device.

As is well known, during operation, a magnetic head incorporated in, for example, a hard disk unit floats a tiny distance above the magnetic recording medium (i.e., the hard disk), which is rotated at high speed. It is also well known that the degree and stability of floatation of the magnetic head greatly influence the reproducing characteristic of the magnetic head. In order that the head device has good floatation characteristics, the sliding surface of the head must be formed with high precision by means of lapping. Further, a tapered chamfered portion is formed on one or both ends of the sliding surface, also by lapping, or alternatively a curved chamfered portion is formed on one or both ends of the sliding surface, by a process other than lapping.

As in the case of the sliding surface of the head, the chamfered portion must be formed with high precision. In addition, the degree of roughness of both the sliding surface and the chamfered portion must be minimized to obtain the optimum floatation characteristics. This is why the chamfered portion is also formed by lapping. Hence, lapping must be performed twice to manufacture the magnetic head.

Furthermore, to maintain the degree of floatation of the magnetic head at a predetermined value, the force applied from a spring to the head must be adjusted such that the head is supported appropriately. In practice, however, it is extremely difficult to maintain the degree of floatation at the predetermined value, due to various factors which vary. Further, it is difficult to prepare a lapping jig of high precision, which is used to form the chamfered portion of the magnetic head. Also it is difficult to attach the magnetic head to the lapping jig with force applied uniformly over the entire contacting surfaces of the head and the jig. Still further, it is hard to lap the whole end portion of the slliding surface of the head to the same degree. Consequently, the chamfered portion cannot be formed with high precision.

SUMMARY OF THE INVENTION

Accordingly it is an object of this invention to provide a new and improved magnetic disk recording/reproducing head device, which has a chamfered position formed easily with high precision on a sliding surface.

It is another object of the present invention to provide a method of manufacturing a magnetic head device, in which the number of processing steps for forming a chamfered portion can be decreased, the precision of the head can be increased, and the process of adjusting the head after mounting it on a magnetic disk apparatus or the like, can be carried out more easily.

According to one aspect of the invention, there is provided a magnetic disk recording/reproducing head device comprising:

a slider member made of magnetic material and having a sliding surface, two end portions, and a groove cut in one of the end portions and extending parallel to the sliding surface, the sliding surface opposing a recording/reproducing disk;

a magnetic circuit having a core member made of a magnetic material and fixed to the other of the end portions of the slider member, with a predetermined magnetic gap formed between the core member and the end portion, and having a coil wound around the core member; and a seal member sealed in the groove and forming a chamfered portion on the sliding surface, said member being made of a material which becomes adhesive when the material is in a melted state, and shrinks when the material is in a solidified state.

BRIEF DESCRIPTION OF THE DRAWING

These and other objects and features of the present invention can be understood through the following embodiments taken with reference to the accompanying drawings, in which:

FIG. 4 is a perspective view of a magnetic head according to a first embodiment of the present invention;

FIG. 5 is a side view of FIG. 4;

FIGS. 6A and 6B to FIGS. 8A and 8B are side views respectively showing second to fourth embodiments of the present invention;

FIG. 13 is a perspective view of the magnetic head according to a seventh embodiment of the present invention;

FIG. 14 is a view illustrating a tapered portion of the magnetic head shown in FIG. 13; and FIG. 15 is a view illustrating the magnetic head according to an eighth embodiment of the present invention.

DETAILED DESCRIPTION OF THE PREFERRED EMBODIMENTS

A basic structure of a magnetic head of this type and problems associated with the conventional edging process and adjustment of an amount of flotation will now be described below.

Figure 1:
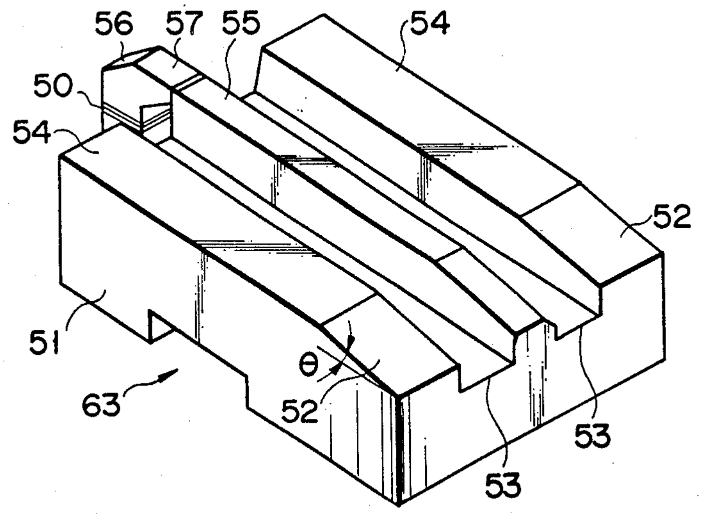
FIG. 1 is a perspective view of a conventional magnetic head.
Figure 2:
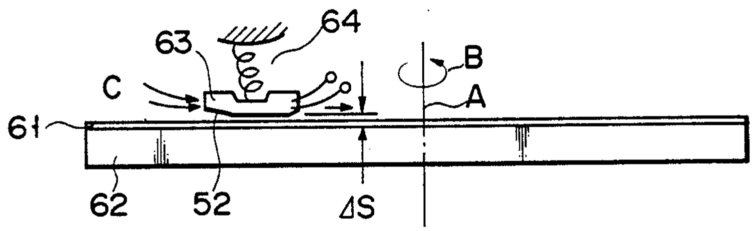
FIG. 2 is a view illustrating a floating operation of a magnetic head.
Figure 3:
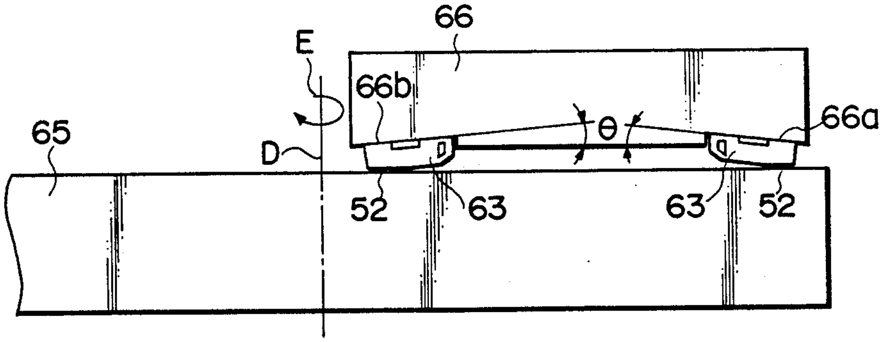
FIG. 3 is a view illustrating a process of forming the tapered portions the conventional magnetic head.

FIGS. 1 to 3 show a conventional magnetic head. FIG. 1 is a perspective view thereof, while FIG. 2 is a view illustrating an operation of the magnetic head. FIG. 3 is a view illustrating a process of forming the tapered portion of the magnetic head.

As shown in FIG. 1, tapered (chamfered) portion 52 inclined at angle $\theta$ (for example, $\theta = 50' \pm 5'$) is formed on a surface (upper surface) of slider block 51 of a rectangular magnetic material at its one end in the longitudinal direction. Slider block 51 constitutes a magnetic head assembly. In addition, grooves 53 having the same width are formed on the upper surface of slider block 51 to be symmetrical about a central line (not shown) in the longitudinal direction. Slider surfaces 54 and convex head surface 55 are respectively formed on both side portions and central portion of the upper surface of slider block 51. Coil 50 is wound around magnetic core 56. Magnetic core 56 is fixed to a side wall of head surface 55, which opposes the side wall on the tapered portions 52 side. Thus, magnetic gap 57 is formed between magnetic core 56 and head surface 55, thereby constituting magnetic head 63.

As shown in FIG. 2, magnetic head 63 having such an arrangement is located above magnetic disk 62 coated with magnetic recording medium 61. Magnetic disk 62 is rotated about central line A at high speed in the direction indicated by arrow B. In this case, magnetic head 63 is floated according to the principle of so-called air bearing, which utilizes air streams indicated by arrows C generated between magnetic disk 62 and tapered portions 52 of magnetic head 63. A predetermined distance ($\Delta S$) between magnetic disk 62 and magnetic head 63 is kept according to a balance between magnetic head 63 and spring 64 for supporting magnetic head 63, thereby performing magnetic recording/reproducing.

However, in order to keep magnetic head 63 at a predetermined floating distance above magnetic disk 62, a high precision process is required because the flotation characteristic of tapered portions 52 formed on magnetic head 63 has a great influence. For this reason, as shown in FIG. 3, soft metal lap disk 65 of tin or the like is used. Lap disk 65 is rotated about central line D in the direction indicated by arrow E. Magnetic head 63 is adhered to lap jig 66 using an adhesive or the like. Lap jig 66 has a recess having reference surfaces **66*a* and 66*b* inclined to correspond to tapered angle $\theta$ of magnetic head 63. Tapered portions 52 are formed by rotating jig 66 and lapping with lap (abrasive) particles on lap disk 65**.

In such a process, however, it is difficult to obtain uniform precision of a lap jig, uniformity of an adhesive when a magnetic head is attached to the lap jig, and a constant removal amount by lapping. Therefore, not only the number of steps of processing is increased, but also the tapered portions are formed with degraded precision. As a result, an amount of flotation cannot be kept constant. Furthermore, spring 64 in FIG. 2 for supporting magnetic head 63 greatly varies in characteristics. Therefore, in order to obtain a predetermined amount of flotation ($\Delta S$), various fine, complicated adjustments must be performed after magnetic head 63 is attached to a magnetic disk recording/reproducing apparatus (not shown).

Embodiments of a magnetic head according to the present invention, in which the above problems are solved, will be described below with reference to the accompanying drawings.

FIGS. 4 to 5 show a first embodiment of the present invention. Referring to FIG. 4, a plurality of head sliding surfaces 6 are formed on the upper surface of slider block 5 of a magnetic material constituting a magnetic head. Sliding surfaces 6 project from grooves **6*a* formed therebetween and are parallel to each other. Sliding surfaces 6 are processed with high precision so as to decrease their roughness. Coil 4 is wound around magnetic core 3. Magnetic core 3 is fixed to one end portion of sliding block 5 in a direction perpendicular to sliding surfaces 6 so as to form magnetic gap 2 between magnetic core 3 and a corresponding one of sliding surfaces 6**.

Sealing groove 7 is formed in the other end portion of slider block 5 in the direction perpendicular to sliding surfaces 6 to be parallel to sliding surfaces 6. Sealing agent 8 having an adhesive property upon melting and a shrinking property upon stiffening is sealed in groove 7. Sealing agent 8 is composed of, e.g., a normal organic adhesive and sealing glass having a thermal expansion coefficient larger than that of slider block 5. When sealing agent 8 is stiffened, it is shrunk. As shown in FIG. 5, when sealing agent 8 is stiffened, collar portion **5*a* of slider block 5 is pulled by sealing agent 8 and is warped in the direction indicated by arrow F. Thus, the end portions of sliding surfaces 6 are curved, such as a chamfered portion. The form of these curved (chamfered) portions can be arbitrarily changed according to the form, depth, and position of groove 7, and the thickness of collar portion 5*a* for sealing and the property of sealing agent 8**.

According to the embodiment of the present invention, the end portions of head sliding surfaces 6 do not require the conventionally high precision process, complicated edging process and the sliding surfaces processed with high precision to the end portions can be maintained. Therefore, a surface finishing process for the end portion is not necessary. In addition, sealing agent 8 used in the edging process can be used in other steps of manufacturing a magnetic head as an adhesive, thereby decreasing the number of steps.

Figure 6B:
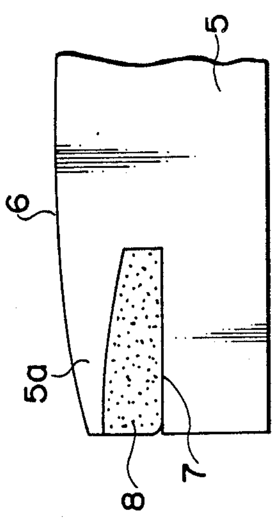
Figure 7B:
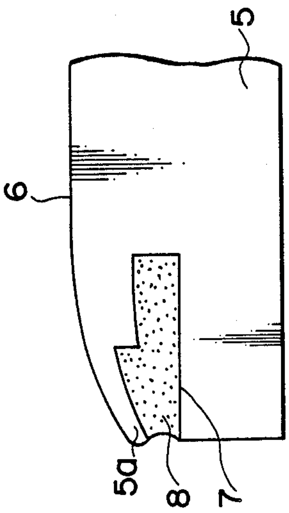
Figure 6A:
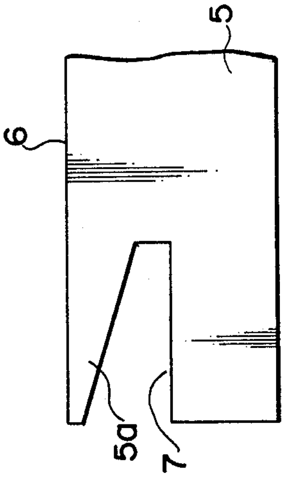
Figure 7A:
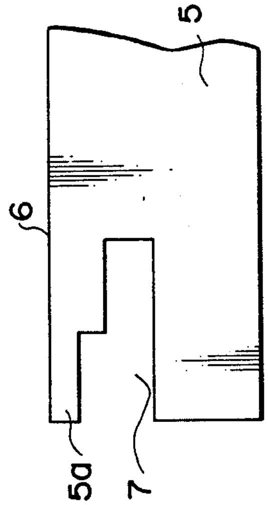
Figure 8A:
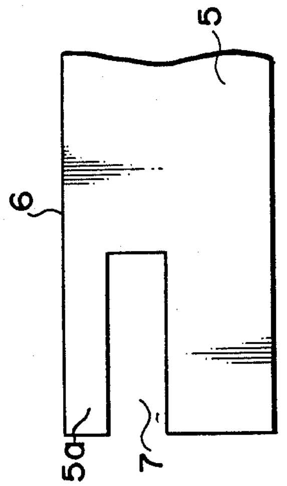
Figure 8B:
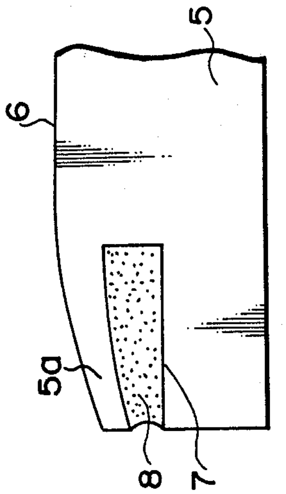
Figure 9A:
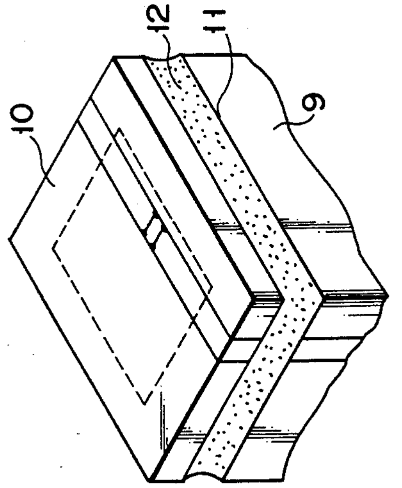
FIG. 9A and 9B are perspective views of the magnetic head according to a fifth embodiment of the present invention.
Figure 9B:
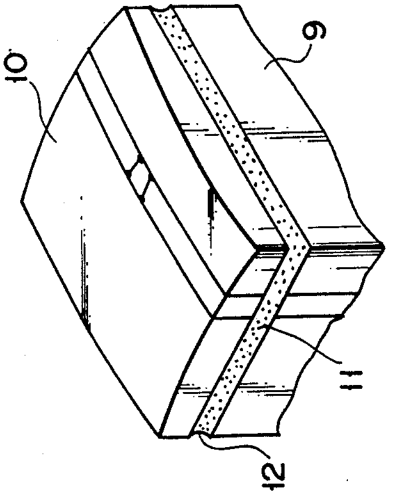

FIGS. 6A and 6B to 9 show second to fifth embodiments. In the second embodiment shown in FIG. 6A, sealing groove 7 is formed such that collar portion **5*a* is tapered toward its edge to have an inclination. As shown in FIG. 6B, when sealing agent 8 is sealed and stiffened, the end portions of sliding surfaces 6 have a curvature larger than that in FIG. 5, such as the chamfered portion. In the third embodiment shown in FIGS. 7A and 7B, the upper surface of sealing groove 7 has two steps so that the thickness of the distal end portion of collar 5*a* is reduced. In the third embodiment, the same effect as that in the second embodiment shown in FIGS. 6A and 6B can be obtained. In the fourth embodiment in FIGS. 8A and 8B, FIG. 8A shows an empty groove 7, and FIG. 8B shows a state of sealing agents 8 pulled in groove 7**, thereby obtaining the same effect as that in the previous embodiments.

In each embodiment described above, only one end portion of slider block 5 is edged. However, both the end portions of slide block 5 can be edged. In the case of a magnetic head used in a floppy disk unit, the entire edge of a sliding surface must be edged. In this case, as in the fifth embodiment shown in FIGS. 9A and 9B, sealing groove 11 can be formed along the entire edge of sliding surface 10 of slider block 9 and shrinkable sealing agent 12 can be sealed in groove 11. With this arrangement, when sealing agent 12 is stiffened and shrunk, curved surfaces can be formed on the entire end portions of sliding surface 10. Furthermore, in the above-described embodiments, sealing agents 8 and 12 having a shrinking property upon stiffening are used. However, a sealing agent having an expansion property upon stiffening may be sealed in sealing grooves 7 and 11. When the sealing agent is stiffened, an end portion of slider block 5 is expanded so as to form a sliding surface having a recess formed at the center.

As has been described above, according to the first to fifth embodiments of the present invention, a sealing groove is formed in an end portion of a sliding surface, and a sealing agent having a shrinking property or an expansion property is sealed in this groove. When this sealing agent having the shrinking or expansion property is stiffened, a curved surface is formed on an end portion of the sliding surface, thereby facilitating the edging process and finishing the surface with high precision.

Figure 10:
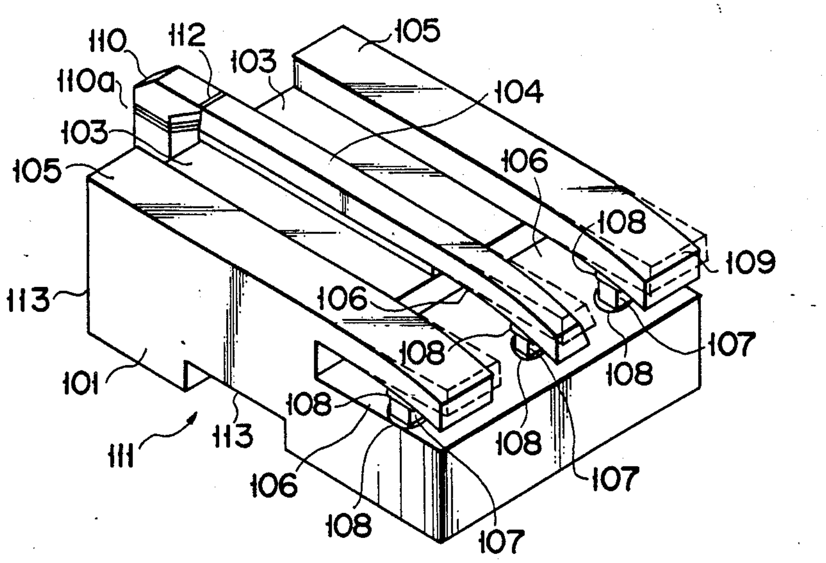
FIG. 10 is a perspective view of the magnetic head according to a sixth embodiment of the present invention.
Figure 11:
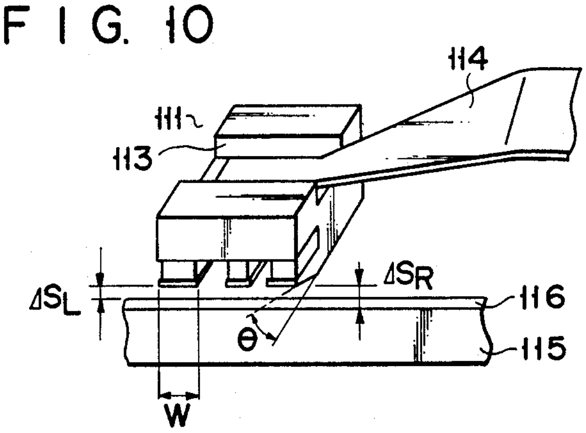
FIG. 11 is a view illustrating a floating operation of the magnetic head in FIG. 10.
Figure 12:
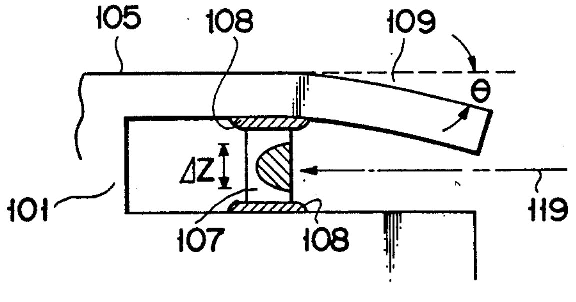
FIG. 12 is a view illustrating a tapered portion of the magnetic head shown in FIG. 10.

FIG. 10 is a perspective view of a magnetic head according to a sixth embodiment of the present invention. FIG. 11 illustrates an operation of the magnetic head in FIG. 10. FIG. 12 illustrates a tapered portion forming section of the magnetic head in FIG. 10.

Referring to FIG. 10, two grooves 103 having the same width are formed on a surface (upper surface) of slider block 101 of a rectangular magnetic material constituting a head core assembly to be symmetrical about a central line in the longitudinal direction. Thus, head surface 104 and slider surfaces 105 are defined on central and side portions of the upper surface of block 101. Notched portion 106 having a constant width from the bottom surface and having a predetermined depth is formed in one of side walls of block 101 opposing to each other in the longitudinal direction. Taper members 107, each having a thermal expansion coefficient larger than that of slider block 101, are formed between inner surfaces of notched portion 106 formed on the lower surface sides of head and slider surfaces 104 and 106 and an inner surface opposite thereto. After both ends of each of taper members 107 and the inner surfaces of notched portion 106 are kept at a predetermined temperature and adhesive 108 such as low-melting glass is welded, they are returned to a normal temperature. As a result, taper members 107 are shrunk, and head and slider surfaces 104 and 105 are curved toward the lower surface side to form tapered portions 109, respectively. Coil 110*a* is wound around magnetic core 110. Magnetic core 110 is fixed to a side surface opposite to the side surface, in which notched portion 106 is formed, so as to form a predetermined gap between magnetic core 110 and an end portion of head surface 104, thereby forming magnetic recording/reproducing gap 112. Support portion 113 is formed in the lower surface of slider block 101.

In magnetic head 111 having such an arrangement, in order to incline each tapered portion 109 of head and slider surfaces 104 and 105 at predetermined angle $\theta$, a material of taper member 107 is selected such that it has a thermal expansion coefficient larger than that of slider block 101. Therefore, the number of steps of processing can be decreased compared with the conventional method of forming tapered portions by lapping.

As shown in FIG. 11, in the state wherein magnetic head 111 is inserted in a magnetic disk unit, magnetic head 111 is supported by leaf spring 114 in support portion 113. Magnetic head 111 floats while balancing with air streams generated by magnetic disk 115 rotated at high speed. For this reason, if floating distances $\Delta S_L$ and $\Delta S_R$ of left and right slider surfaces 105 do not coincide with each other because of differences in width (W), taper angle ($\theta$), and areas of the left and right tapered portions when magnetic head 111 is viewed from tapered portions 109, and because of differences in supporting force of leaf spring 114, or the like, the floating distances of the left and right tapered portions must be equalized by adjusting tapered portions 109.

However, in magnetic head 111 according to the embodiment of the present invention, as shown in FIG. 12, part of tapered portion forming member 107, which has formed tapered portion 109, is irradiated with beam 119 such as a laser or infrared beam to be heated and melted. Then, the irradiated part ($\Delta Z$) is stiffened and shrunk to correct taper angle $\theta$ (for example, $\theta = 50' \pm 5'$) of tapered portion 109.

Therefore, unlike in the conventional techniques, fine adjustment can be performed while a magnetic head is attached to a magnetic disk unit, thereby simply and stably keeping the floating distance constant.

FIG. 13 is a perspective view of a magnetic head according to a seventh embodiment of the present invention.

According to the embodiment, two different tapered portion forming members 107*a* and 107*b* are formed between inner surfaces of notched portion 106 at predetermined intervals. Each of tapered portion forming members 107*a* and 107*b* is welded to the inner surfaces of notched portion 106 with adhesive 108 to form tapered portion 109. Other structures are the same as those shown in FIG. 10.

The seventh embodiment is advantageous over the sixth embodiment in FIG. 10 in that as shown in FIG. 14, an adjustment amount by means of shrinkage of the local portion ($\Delta Z$) of tapered portion forming member 107*b* can be finely controlled because tapered portion forming member 107*a* is formed on a distal end side of tapered portion 109. In addition, this structure can prevent tapered portion 109 from returning to the original position when the local portion is melted.

FIG. 15 is a sectional view showing an eighth embodiment of the present invention. According to the embodiment, coating layer 120 is formed on the outer surface of tapered portion forming member 107. Coating layer 120 is melted to change its thermal expansion coefficient when tapered portion forming member 107 is melted. Other structures are the same as those in FIG. 10.

In this embodiment, the following effect can be obtained by changing the material of coating layer 120 of tapered portion forming member 107. Assume that tapered portion forming member 107 is composed of glass. Then, if $P_bO$ or $B_a$ is used, the thermal expansion coefficient can be increased by fusing into glass upon melting. If $SiO_2$ or $A_{12}O_3$ is used, the thermal expansion coefficient can be decreased, thereby allowing easy and efficient control of an adjustment amount of taper angle $\theta$.

In the embodiment, glass is exemplified as a tapered portion forming member. However, the present invention is not limited to this. For example, if the thermal expansion coefficient can be greatly changed by using a combination of different metals to be melted into an alloy, the same effect can be obtained.

As has been described above, according to the sixth to eighth embodiments of the present invention, tapered portions can be easily formed and the number of steps of processing can be decreased using a tapered portion forming member having an adequate thermal expansion coefficient. In addition, according to these embodiments, adjustment during the operation can be easily performed and a stable performance can be obtained.

Moreover, the present invention is advantageous in that adjustment can be easily performed by changing the material of a tapered portion forming member.

What is claimed is:

1. A magnetic head device having a sloped sliding surface, said device comprising:

a magnetic material slider member having at least one sliding surface and a groove portion for providing a thick collar portion near the sliding surface;

a magnetic circuit having a core member made of a magnetic material and fixed to said slider member with a predetermined magnetic gap formed between the sliding surface and the core member, and having a coil wound around the core member; and a slope forming member inserted into the groove portion of said slider member and thermally reacting on the collar portion of said slider member, thereby curving the collar portion in a direction of the groove portion so that the sliding surface of said slider member is substantially sloped.

2. A device according to claim 1, wherein said collar portion has been formed so as to taper toward the end portion thereof.

3. A device according to claim 2, wherein said collar portion is formed in the shape of a step.

4. A device according to claim 1, wherein said collar portion is inclined.

5. A device according to claim 4, wherein said collar portion is inclined inside said groove portion.

6. A device according to claim 4, wherein said collar portion is inclined outside said groove portion.

7. A device according to claim 1, wherein said groove portion is formed throughout all the side surfaces of said slider member.

8. A device according to claim 7, wherein said slope forming member is inserted in the entire groove portion to slope all the edges of said sliding surface.

9. A device according to claim 1, wherein said slope forming member includes an adhesive.

10. A device according to claim 9, wherein said adhesive comprises a material whose thermal expansion coefficient is larger than that of said slider member.

11. A device according to claim 10, wherein said adhesive includes sealing glass.

12. A device according to claim 1, wherein said slope forming member includes a tapered member formed between opposite inner surfaces of the groove portion of said slider member and having a thermal expansion coefficient larger than that of said slider member.

13. A device according to claim 12, wherein said collar portion is divided into a plurality of collar portions by a notched portion which is formed from the bottom surface of said groove portion with a predetermined width and depth, and said tapered member is provided for each of said plurality of collar portions.

14. A device according to claim 12, wherein both ends of said tapered member are fixed to the opposite inner surfaces of said groove portion by a low-meting glass adhesive.

15. A device according to claim 12, wherein a coating layer for changing the thermal expansion coefficient of said tapered member is formed on an outer surface of said tapered member.

* * * * *